United States Patent
Hieber et al.

(10) Patent No.: US 10,227,443 B2
(45) Date of Patent: *Mar. 12, 2019

(54) THERMOPLASTIC POLYURETHANE FOR SEAL APPLICATIONS

(71) Applicant: Carl Freudenberg KG, Weinheim (DE)

(72) Inventors: Juergen Hieber, Schwalmstadt (DE); Edgar Freitag, Schwalmstadt (DE); Martin Franz Goerres, Schwalmstadt (DE); Mathias Burkert, Schwalmstadt (DE); Gonzalo Barillas, Alsfeld-Altenburg (DE); Juergen Jaeckel, Schrecksbach (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/104,540

(22) PCT Filed: Dec. 1, 2014

(86) PCT No.: PCT/EP2014/076086
§ 371 (c)(1),
(2) Date: Jun. 15, 2016

(87) PCT Pub. No.: WO2015/090916
PCT Pub. Date: Jun. 25, 2015

(65) Prior Publication Data
US 2016/0333134 A1    Nov. 17, 2016

(30) Foreign Application Priority Data
Dec. 17, 2013 (DE) .................. 10 2013 021 027

(51) Int. Cl.
*C08G 18/10* (2006.01)
*C08G 18/76* (2006.01)
(Continued)

(52) U.S. Cl.
CPC ........ *C08G 18/7685* (2013.01); *C08G 18/12* (2013.01); *C08G 18/4018* (2013.01);
(Continued)

(58) Field of Classification Search
CPC ............... C08G 18/7685; C08G 18/12; C08G 18/4018; C08G 18/4277; C08G 18/44;
(Continued)

(56) References Cited

U.S. PATENT DOCUMENTS

| 5,001,208 A | 3/1991 | Ross et al. |
| 5,013,811 A | 5/1991 | Ross |

(Continued)

FOREIGN PATENT DOCUMENTS

| CN | 102532462 A | * | 7/2012 | ............. C08G 18/66 |
| CN | 102532462 A | * | 7/2012 | ............. C08G 18/66 |

(Continued)

OTHER PUBLICATIONS

Document N_English Translation.*

*Primary Examiner* — Michael L Leonard
(74) *Attorney, Agent, or Firm* — Leydig, Voit & Mayer, Ltd.

(57) ABSTRACT

A thermoplastic polyurethane is obtained via reaction of isocyanates (a) with a polyol component (b) having at least one polyesterdiol (b1), at least one polyetherdiol (b2) and at least one polycarbonatediol (b3), in each case with a molar mass of from 500 to 5000 g/mol, and also with at least one diol with a molar mass of from 62 to 500 g/mol. The thermoplastic polyurethane can be used for producing moldings, more particularly seals, coupling stars, valves, and profiles. The polyurethane has exceptional mechanical and chemical properties.

19 Claims, 3 Drawing Sheets

(51) Int. Cl.
*C08G 18/65* (2006.01)
*C08G 18/48* (2006.01)
*C08G 18/42* (2006.01)
*C08G 18/40* (2006.01)
*C08G 18/12* (2006.01)
*C08G 18/44* (2006.01)

(52) U.S. Cl.
CPC ..... *C08G 18/4269* (2013.01); *C08G 18/4277* (2013.01); *C08G 18/44* (2013.01); *C08G 18/4833* (2013.01); *C08G 18/4854* (2013.01); *C08G 18/65* (2013.01); *C08G 18/6517* (2013.01); *C08G 2190/00* (2013.01)

(58) Field of Classification Search
CPC ............ C08G 18/4854; C08G 18/4833; C08G 18/4269; C08G 18/65; C08G 18/6517
See application file for complete search history.

(56) References Cited

U.S. PATENT DOCUMENTS

| | | | | |
|---|---|---|---|---|
| 5,290,905 | A * | 3/1994 | Komiya | C08G 18/44 428/902 |
| 5,925,697 | A | 7/1999 | Braeuer et al. | |
| 6,518,389 | B1 * | 2/2003 | Kaufhold | C08G 18/0895 528/59 |
| 2003/0013792 | A1 | 1/2003 | Muhlfeld et al. | |
| 2007/0265413 | A1 * | 11/2007 | Peerlings | C08G 18/3221 528/79 |
| 2011/0186329 | A1 * | 8/2011 | Makal | C08G 18/6607 174/113 R |
| 2012/0116044 | A1 * | 5/2012 | Kunst | C08G 18/4887 528/77 |
| 2013/0102723 | A1 * | 4/2013 | Wamprecht | C08G 18/3203 524/537 |

FOREIGN PATENT DOCUMENTS

| | | |
|---|---|---|
| DE | 2059570 A | 6/1971 |
| DE | 1964834 A | 7/1971 |
| DE | 2302564 A1 | 7/1974 |
| DE | 2901774 A1 | 7/1980 |
| DE | 4217364 A1 | 12/1993 |
| DE | 19607870 A1 | 9/1997 |
| DE | 10050495 B4 | 4/2002 |
| EP | 0837083 A2 | 4/1998 |
| EP | 1010712 B1 | 6/2000 |
| EP | 1873178 A2 | 1/2008 |
| GB | 1057018 A | 2/1967 |
| WO | WO 9011309 A | 10/1990 |

* cited by examiner

THERMOPLASTIC POLYURETHANE FOR SEAL APPLICATIONS

CROSS-REFERENCE TO RELATED APPLICATIONS

This application is a U.S. national stage application under 35 U.S.C. § 371 of International Application No. PCT/EP2014/076086, filed on Dec. 1, 2014, and claims benefit to German Patent Application No. DE 10 2013 021 027.5, filed on Dec. 17, 2013. The International Application was published in German on Jun. 25, 2015, as WO 2015/090916 A1 under PCT Article 21(2).

FIELD

The invention relates to a thermoplastic polyurethane (TPU) for the production of technical products, such as seals, spider couplings, valves and profiles. The invention further relates to the production of the TPU according to the invention and to seals manufactured therefrom.

BACKGROUND

Thermoplastic polyurethanes belong to the class of the thermoplastic elastomers. Thermoplastic elastomers have a uniform structural principle regardless of their chemical composition. They are block copolymers in which hard blocks are connected to soft blocks in a polymer chain. Hard blocks are understood as being polymer segments whose softening temperature (that is to say glass transition temperature and/or crystallite melting temperature) is far above the use temperature. Soft blocks are understood as being polymer segments having softening temperatures far below the use temperature. The hard blocks form physical linkages between the soft polymer blocks, which linkages are reversibly cleaved during thermoplastic processing and can be re-formed upon cooling. Typical examples of thermoplastic polyurethanes are styrene-butadiene block copolymers having hard polystyrene blocks (glass transition temperature approximately 105° C.) and soft polybutadiene blocks (glass transition temperature approximately −90° C.).

Thermoplastic polyurethane elastomers (TPU) have been known for a long time. They are important technically owing to the combination of high-quality mechanical properties with the known advantages of inexpensive thermoplastic processability. By using different chemical structural components, it is possible to achieve a wide range of variation of mechanical properties. An overview of TPUs, their properties and uses is given, for example, in Kunststoffe [plastics material] 68 (1978), pages 819 to 825 or Kautschuk, Gummi, Kunststoffe [unvulcanized rubber, vulcanized rubber, plastics material] 35 (1982), pages 568 to 584. TPUs usually contain as the semi-crystalline hard phase the reaction product of an organic diisocyanate with a low molecular weight diol and as the amorphous soft phase the reaction product of an organic diisocyanate with a higher molecular weight diol, for example a polyester, polyether or polycarbonate diol having molecular weights of usually from 500 to 5000 g/mol. A wide variety of property combinations can purposively be established via the polyols. In order to accelerate the formation reaction, catalysts can additionally be added. In order to adjust the properties, the structural components can be varied within relatively wide molar ratios. Molar ratios of polyols to diisocyanates to chain extenders of from 1:3:2 to 1:10:9 have been found to be successful in many cases. Products in the range of from 60 Shore A to 75 Shore D can thereby be obtained.

Thermoplastically processable polyurethane elastomers can be synthesized stepwise by the prepolymer metering process. Alternatively, the reaction can take place by the stepwise ester-split process, in which a portion of the polyol is metered in with the chain extender, or by the simultaneous reaction of all the components in one stage, the so-called one-shot metering process, or by production in a reaction extruder.

TPUs can be produced continuously or discontinuously. The most well known commercial production processes are the belt process (GB 1 057 018 A) and the extruder process (DE 19 64 834 A, DE 23 02 564 A, and DE 20 59 570 A).

For the use of TPUs in seals, the following chemical, static and dynamic properties inter alia are relevant: resistance to the media that are used or that occur in the surroundings, temperature resistance at high temperatures, flexibility at low temperatures, pressure resistance, extrusion resistance, wear behavior and relaxation behavior. In polyurethanes, these properties are determined very greatly by the nature of the polyols used. Each class of polyol materials has specific advantages and disadvantages owing to its chemical structure.

Polyols based on polycarbonates provide high mechanical strength and, owing to the high soft segment melting range which is produced by polycarbonates, good properties at high use temperatures. Furthermore, polycarbonates exhibit excellent hydrolytic stability. However, the low-temperature properties are relatively poor on account of the high glass transition temperature of polycarbonates. In addition, polycarbonate-based TPUs have little flexibility owing to the inherent tendency of the material to crystallization.

Polyols based on polycaprolactones, on the other hand, permit a balanced property profile in respect of low-temperature properties, hydrolytic stability and mechanical strength, but they do not achieve peak values in any of the mentioned properties. However, since the ester bond has a tendency to hydrolysis in acidic or alkaline media, polyurethanes based on polycaprolactone polyols are less hydrolytically stable than materials based on polyethers or polycarbonates.

Polyols based on polyesters produced by polycondensation have high stiffness at low temperatures. In addition, they have low hydrolytic stability. However, such polyester polyols exhibit very good strength and also very good wear and abrasion properties.

Polyols based on polyethers lead to very good hydrolytic stability because of the stability of the ether bond. Moreover, the very low glass transition temperature in polyether polyols leads to substantially lower possible use temperatures and substantially better low-temperature properties in comparison with polyester and polycarbonate polyols, as well as higher flexibility. The disadvantage of polyether polyols is, however, that, of all the known polyols, they lead to the lowest mechanical strengths and at the same time have very poor high-temperature properties.

Copolymers of at least two of the mentioned polyol classes, which can be obtained, for example, by a stepwise polymerization of two different monomers that are capable of copolymerization or by polymerizing a different monomer onto an already existing polyol, combine the properties of the polyol classes used and allow better control of the rate of reaction than does a mixture of two different polyols. Furthermore, the use of copolymers leads to better constancy in the properties of the TPU materials that are produced than does a comparable polyol mixture.

SUMMARY

An aspect of the invention provides a thermoplastic polyurethane, obtained by a process comprising reacting reagents comprising (a) an isocyanate with a (b) a polyol component comprising a polyester diol (b1), a polyether diol (b2), and a polycarbonate diol (b3), each having a molecular weight in a range of from 500 to 5000 g/mol, and (c) a diol having a molecular weight of from 62 g/mol to 500 g/mol.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the present invention develops a TPU material which, where possible, combines in the finished material all the positive material properties mentioned above in relation to the starting materials and at the same time minimizes or eliminates altogether the negative material properties.

An aspect of the invention provides a thermoplastic polyurethane for use in technical products, such as seals, spider couplings, valves and profiles, and in particular in seals for hydraulic and pneumatic applications, which thermoplastic polyurethane is obtainable by reacting isocyanates (a) with a polyol component (b) comprising a combination of at least one polyester diol (b1), at least one polyether diol (b2) and at least one polycarbonate diol (b3), each having a molecular weight of from 500 to 5000 g/mol, preferably from 1000 g/mol to 3000 g/mol and particularly preferably from 1500 g/mol to 2500 g/mol, and diols (c) having a molecular weight of from 62 g/mol to 500 g/mol, preferably from 62 g/mol to 300 g/mol, and optionally a trifunctional cross-linker (d) having a molecular weight of from 64 g/mol to 500 g/mol, preferably from 64 g/mol to 300 g/mol.

Surprisingly, it has been found according to the invention that, by using as described above a soft segment comprising a combination of polyester diols (b1), polyether diols (b2) and polycarbonate diols (b3), it is possible to produce TPUs which have an excellent property profile in particular for use in the seals field.

Practical tests have shown that the TPU according to the invention has very high hydrolytic stability and stability to media as well as very good mechanical properties in the high- and low-temperature range, very good tightness and excellent wear and extrusion behavior and thus a very long service life. In particular, it has been found, surprisingly, that the TPU according to the invention has a better property profile than is to be expected from the extrapolation of the properties of the individual components.

An important feature of the TPU according to an aspect of the invention is that the soft segment comprises a combination of (b1) polyester diols, (b2) polyether diols and (b3) polycarbonate diols. In the production of the TPU, the mentioned diols can be used as a mixture and/or in the form of copolymers thereof. The diols (b1, b2, b3) of the soft segment preferably have a molecular weight of from 500 to 5000 g/mol and particularly preferably from 1000 g/mol to 3000 g/mol and in particular from 1500 g/mol to 2500 g/mol. If the diols are used in the form of copolymers, the molecular weights of the copolymers are preferably in the range of from 500 to 5000 g/mol, more preferably in the range of from 1000 g/mol to 3000 g/mol and in particular from 1500 g/mol to 2500 g/mol. Adjustment of the molecular weights to the above-mentioned ranges permits good processability of the TPU according to the invention, in particular by injection molding.

According to a preferred embodiment of the invention, the diols of the polyol component (b) are used in the form of copolymers. The copolymers can consist of combinations of the polyol components (b) with one another and/or can comprise other polyol components. The above-described advantages, namely improved controllability of the rate of reaction and better constancy of the properties of the TPU materials produced, can be obtained in particular when a copolymer of combinations of the polyol components (b) with one another is used.

The TPU according to the invention is preferably obtainable by reacting isocyanates (a) with the polyol component (b), the diol (c) and a trifunctional cross-linker (d) having a molecular weight of from 64 g/mol to 500 g/mol, preferably from 64 g/mol to 300 g/mol. The use of the trifunctional cross-linker has the advantage that the mechanical properties, in particular the tensile strength and the compression set, can be increased by a three-dimensional branching within the material.

According to a preferred embodiment of the invention, the proportion of the polyether polyol component in the polyol component (b) is from 10 mol % to 80 mol %, preferably from 15 mol % to 50 mol %, particularly preferably from 20 mol % to 40 mol %. The proportion of the polycarbonate polyol component in the polyol component (b) is preferably from 10 mol % to 80 mol %, particularly preferably from 25 mol % to 70 mol %, yet more preferably from 40 mol % to 60 mol %. The remainder of the polyol component (b) is preferably formed by polyester polyol.

The mean functionality of the diols used in the polyol component (b) is preferably from 1.8 to 2.5, more preferably from 1.9 to 2.1, particularly preferably from 1.98 to 2.08.

The polyol component (b) is preferably reacted with an organic diisocyanate (a) or a mixture of at least two organic diisocyanates (a) having a functionality of from 1.5 to 3, preferably from 1.9 to 2.1, and with a low molecular weight diol (c) having a molecular weight of from 62 g/mol to 500 g/mol, preferably from 62 g/mol to 300 g/mol, and expediently with a trifunctional cross-linker (d) having a molecular weight of from 64 g/mol to 500 g/mol, preferably from 64 g/mol to 300 g/mol, to form the TPU according to the invention.

There come into consideration as organic diisocyanates (a), for example, aliphatic, cycloaliphatic, araliphatic, heterocyclic and aromatic diisocyanates, as are described, for example, in Justus Liebigs Annalen der Chemie, 562, pages 75 to 136. There may be mentioned specifically by way of example: aliphatic diisocyanates, such as hexamethylene diisocyanate, cycloaliphatic diisocyanates, such as isophorone diisocyanate, 1,4-cyclohexane diisocyanate, 1-methyl-2,4- and -2,6-cyclohexane diisocyanate and the corresponding isomeric mixtures, 4,4'-, 2,4'- and 2,2'-dicyclohexylmethane diisocyanate and the corresponding isomeric mixtures, and aromatic diisocyanates, such as 2,4-toluylene diisocyanate or 3,3'-dimethyl-4,4'-biphenyl diisocyanate or 1,4-phenylene diisocyanate, mixtures of 2,4- and 2,6-toluylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and/or 2,4'-diphenylmethane diisocyanates, 4,4'-diisocyanato-1,2-diphenyl-ethane and 1,5-naphthylene diisocyanate.

Preference is given to the use of 4,4'-diphenylmethane diisocyanate, 3,3'-dimethyl-4,4'-biphenyl diisocyanate and 1,4-phenylene diisocyanate, and most particular preference is given to the use of 3,3'-dimethyl-4,4'-biphenyl diisocyanate. The advantage of the use of 3,3'-dimethyl-4,4'-biphenyl diisocyanate is inter alia the advantageous effect on the crystallization properties of the resulting TPU.

The polyester diols (b1) can be prepared, for example, from dicarboxylic acids having from 2 to 12 carbon atoms, preferably from 4 to 6 carbon atoms, and polyhydric alcohols. There come into consideration as dicarboxylic acids, for example: aliphatic dicarboxylic acids, such as glutaric acid, adipic acid, succinic acid, suberic acid, azelaic acid and sebacic acid, or aromatic dicarboxylic acids, such as phthalic acid, isophthalic acid and terephthalic acid. The dicarboxylic acids can be used on their own or as mixtures, for example in the form of a succinic, glutaric and adipic acid mixture. It may optionally be advantageous for the preparation of the polyester diols to use instead of the dicarboxylic acid the corresponding dicarboxylic acid derivatives, such as carboxylic acid diesters having from 1 to 4 carbon atoms in the alcohol moiety, for example dimethyl terephthalate or dimethyl adipate, carboxylic anhydrides, for example succinic anhydride, glutaric anhydride or phthalic anhydride, or carboxylic acid chlorides. Examples of polyhydric alcohols are glycols having from 2 to 10, preferably from 2 to 6, carbon atoms, for example ethylene glycol, diethylene glycol, 1,4-butanediol, 1,5-pentanediol, 1,6-hexanediol, 1,10-decanediol, 2,2-dimethyl-1,3-propanediol, 1,3-propanediol, 2-methylpropanediol, 1,3,3-methyl-1,5-pentanediol or dipropylene glycol. Furthermore, polyester diols (b1) can also be synthesized from polymerized polycaprolactone having a molecular weight of from 500 g/mol to 5000 g/mol. Preference is given to the use of polyester diols (b1) based on polycaprolactone having a molecular weight of from 1000 g/mol to 3000 g/mol and particularly preferably from 1500 g/mol to 2500 g/mol.

As described above, the use of polyester diols (b1) based on polycaprolactone has the advantage that they permit a balanced property profile in respect of low-temperature properties, hydrolytic stability and mechanical strength. Moreover, it has been found, surprisingly, that, by combining the polyester diol (b1) based on polycaprolactone with the other two polyol components (b2) and (b3), it is possible to compensate for the lack of hydrolytic stability of the TPU, which must usually be accepted when a polyester diol (b1) based on polycaprolactone is used.

Polyether diols suitable as component (b2) can be prepared, for example, by reacting one or more alkylene oxides having from 2 to 4 carbon atoms in the alkylene moiety with a starter molecule containing two active hydrogen atoms bonded therein. Suitable alkylene oxides are, for example: ethylene oxide, 1,2-propylene oxide, epichlorohydrin and 1,2-butylene oxide and 2,3-butylene oxide. Ethylene oxide, propylene oxide and mixtures of 1,2-propylene oxide and ethylene oxide are preferably used. The alkylene oxides can be used on their own, alternately in succession or in the form of mixtures. There come into consideration as starter molecules, for example: water, amino alcohols, such as N-alkyl-diethanolamines, for example N-methyldiethanolamine, and diols, such as ethylene glycol, 1,3-propylene glycol, 1,4-butanediol and 1,6-hexanediol. Mixtures of starter molecules may optionally also be used. Suitable polyetherols are further the hydroxyl-group-containing polymerization products of tetrahydrofuran. Particular preference is given to the use of polyether diols (b2) based on ethylene oxide, propylene oxide and/or hydroxyl-group-containing polymerization products of tetrahydrofuran. The polyether diols (b2) have mean molecular weights of from 500 to 5000 g/mol, preferably from 1000 g/mol to 3000 g/mol and particularly preferably from 1500 g/mol to 2500 g/mol.

As described above, advantages of the use of polyether diols (b2), in particular of the above-mentioned polyether diols (b2), are high hydrolytic stability and high flexibility and, as a result, low possible use temperatures and advantageous low-temperature properties. Surprisingly, it has been found that, by combining a polyether diol (b2), in particular one of the above-mentioned polyether diols (b2), with the other two polyol components (b3) and (b1), it is possible to compensate for the above-described negative properties of TPUs based on polyether diols (b2), namely low mechanical strength and disadvantageous high-temperature properties.

Polycarbonate diols suitable as component (b3) can be prepared by reacting at least one polyol component, such as 1,4-butanediol, 1,5-pentanediol, 3-methyl-1,5-pentanediol, 1,6-hexanediol, 2-methyl-1,8-octanediol, 1,9-nonanediol or 1,4-cyclohexanedimethanol, with at least one organic carbonate, for example with dimethyl carbonate. Preference is given to the use of polycarbonate diols (b3) based on 1,6-hexanediol, 1,9-nonanediol and/or 1,5-pentanediol. Preference is given to the use of polycarbonate diols (b3) having a molecular weight of from 500 to 5000 g/mol, preferably from 1000 g/mol to 3000 g/mol and particularly preferably from 1500 g/mol to 2500 g/mol.

As described above, advantages of the use of polycarbonate diols (b3), in particular of the above-mentioned polycarbonate diols (b3), are their high mechanical strength and their good mechanical properties at high use temperatures, as well as excellent hydrolytic stability. Surprisingly, it has been found that, by combining a polycarbonate diol (b3), in particular one of the above-mentioned polycarbonate diols (b3), with the other two polyol components (b2) and (b1) in the TPU, it is possible to compensate for the disadvantageous mechanical properties at low temperatures which must usually be accepted when a polycarbonate diol (b3) is used.

The polyols (b1, b2, b3) are expediently linear. This is advantageous because, by using linear polyols, TPUs having good thermoplastic processability can be obtained.

According to the invention there is used as the polyol (b) a combination of at least one polyester diol (b1), at least one polyether diol (b2) and at least one polycarbonate diol (b3). This means that the polyol component (b1) can comprise one or more polyester diols. Likewise, the polyol component (b2) can comprise one or more polyether diols and the polyol component (b3) can comprise one or more polycarbonate diols. However, preference is given according to the invention to the use of a polyol (b) in which the polyol components (b1), (b2), (b3) each comprise only one polyol.

Chain extenders (c) are used for the production of the TPU according to the invention. The chain extenders (c) are used to synthesize the hard segments in the TPU. There are preferably used as chain extenders (c) diols having molecular weights of from 62 g/mol to 500 g/mol, preferably from 62 g/mol to 300 g/mol. There come into consideration, for example, aliphatic, cycloaliphatic and/or araliphatic diols having from 2 to 14, preferably from 2 to 10, carbon atoms, such as ethylene glycol, 1,3-propanediol, 1,2-propanediol, 1,10-decanediol, o-, m- and p-dihydroxycyclohexane, diethylene glycol, dipropylene glycol, and preferably ethylene glycol, 1,4-butanediol, 1,6-hexanediol and bis-(2-hydroxyethyl)-hydroquinone, low molecular weight hydroxyl-group-containing polyalkylene oxides based on ethylene oxide and/or 1,2-propylene oxide and the above-mentioned diols as starter molecules.

There are preferably used as chain extenders (c) 1,4-butanediol, 1,6-hexanediol or 1,4-di(α-hydroxyethyl)-hydroquinone. Mixtures of the mentioned chain extenders (c) can also be used.

According to a preferred embodiment of the invention, trifunctional cross-linkers (d) having a functionality >2 are used in the production of the TPU. The use of trifunctional cross-linkers (d) has the advantage that the mechanical properties, in particular the tensile strength and the compression set, can be increased by a three-dimensional branching within the material. Practical tests have shown that particularly good mechanical properties can be achieved with triols such as 1,2,4-, 1,3,5-trihydroxy-cyclohexane, glycerol and/or trimethylolpropane. The trifunctional cross-linkers (d) used according to the invention can have a molecular weight of from 64 g/mol to 500 g/mol, preferably from 64 g/mol to 300 g/mol.

Furthermore, conventional monofunctional compounds can also be used in small amounts, for example as chain terminators or demolding aids. Examples which may be mentioned are alcohols such as octanol and stearyl alcohol or amines such as butylamine and stearylamine.

For the production of the TPUs according to the invention, the structural components can be reacted, optionally in the presence of catalysts, auxiliary agents and/or additives, preferably in amounts such that the equivalence ratio of NCO groups from component (a) to the sum of the NCO-reactive groups, in particular the OH (or NH) groups, of the low molecular weight compounds (c, d) and of the polyols (b1, b2, b3) is from 0.9:1.0 to 1.2:1.0.

Suitable catalysts are, for example, the tertiary amines which are known and conventional according to the prior art, such as triethylamine, dimethylcyclohexylamine, N-methylmorpholine, N,N'-dimethylpiperazine, 2-(dimethylaminoethoxy)-ethanol, diazabicyclo-(2,2,2)-octane and the like, as well as in particular organic metal compounds such as titanic acid esters, iron compounds, tin compounds, for example tin diacetate, tin dioctoate, tin dilaurate or the tin dialkyl salts of aliphatic carboxylic acids, such as dibutyltin diacetate, dibutyltin dilaurate or the like. Preferred catalysts are tertiary amines such as diazabicyclo-(2,2,2)-octane. The total amount of catalysts in the TPUs is generally approximately from 0 to 5 wt. %, preferably from 0 to 1 wt. %, based on the total amount of TPU.

The use of tertiary amines as catalysts is advantageous because this class of catalyst does not contain any problematic heavy metals as the catalytically active substance.

In addition to the reaction components and the catalysts, auxiliary agents and/or additives can also be added in an amount of up to 20 wt. %, based on the total amount of TPU. They can be dissolved in one of the reaction components, preferably in the polyol components (b1, b2, b3), or can optionally also be metered in after the reaction has taken place, in a downstream mixing unit, such as an extruder. Also suitable are solids such as fibers or solid lubricants or liquid lubricants or additives which adapt the properties such as strength, wear, friction, tightness, etc. in the particular use to the requirements.

Examples which may be mentioned here are lubricants, such as fatty acid esters, metal soaps thereof, fatty acid amides, fatty acid ester amides and silicone compounds, antiblocking agents, inhibitors, stabilizers against hydrolysis, light, heat and discoloration, flame retardants, dyes, pigments, inorganic and/or organic fillers and reinforcing agents. Reinforcing agents are in particular fibrous reinforcing materials such as inorganic fibers, which are produced according to the prior art and can also be provided with a size. Further details of the mentioned auxiliary substances and additives are to be found in the specialist literature, for example the monograph by J. H. Saunders and K. C. Frisch "High Polymers", Volume XVI, Polyurethane, Part 1 and 2, Verlag Interscience Publishers 1962 or 1964, Taschenbuch für Kunststoff-Additive [Plastics additive handbook] by R. Gächter and H. Müller (Hanser Verlag Munich 1990) or DE 29 01 774 A1.

Further additives which can be incorporated into the TPU are thermoplastics, such as polycarbonates, polyethylenes, PTFE and acrylonitrile/butadiene/styrene terpolymers, in particular ABS. Other elastomers such as rubber, ethylene/vinyl acetate copolymers, styrene/butadiene copolymers and other TPUs can likewise be used. Conventional plasticizers are also suitable for incorporation.

The present invention further provides a process for the production of a thermoplastic polyurethane, comprising the steps (A) preparing a mixture comprising a combination of polyester diols (b1), polyether diols (b2) and polycarbonate diols (b3), each having a molecular weight of from 500 to 5000 g/mol;
(B) adding an organic diisocyanate (a) to the mixture according to (A) in an amount such that the equivalence ratio of NCO groups to NCO-reactive groups is from 2.5:1 to 10:1;
(C) reacting the reaction mixture prepared in step (B) at temperatures of >80° C. to form an NCO-terminated prepolymer;
(D) reacting the NCO-terminated prepolymer prepared in step (C) with one or more chain extenders (c) having a molecular weight of from 62 g/mol to 500 g/mol to form a thermoplastic polyurethane, wherein component (c) is used in an amount such that, taking into consideration all the components, an equivalence ratio of NCO groups to NCO-reactive groups of from 0.9:1.0 to 1.2:1.0 is established.

The polyurethane according to the invention can be produced by the prepolymer process, for example; alternatively, the one-shot process, the ester-split process or production in a reactive extruder are also possible.

In step (A) of the production process described above, a mixture of linear polyols according to (b1), (b2) and (b3), preferably having a functionality of 1.8 and 2.5, is expediently placed in a reaction vessel. This takes place preferably at a temperature above the melting point of the polyols used, usually in a temperature range of from 80° C. to 150° C.

In steps (B) and (C), the polyol mixture is reacted with the total amount or with a portion of the organic diisocyanate (a) or of a mixture of a plurality of organic diisocyanates (a) in a molar NCO/OH ratio of from 2.5:1 to 10:1, in one step or in a plurality of steps at temperatures >80° C. to form a higher molecular weight isocyanate-terminated prepolymer.

In step (D), the resulting prepolymer is reacted with one or more diol chain extenders according to (c) to form a polyurethane.

According to a preferred embodiment of the invention, a trifunctional cross-linker (d) having a molecular weight of from 64 to 350 g/mol is added in steps (B) and/or (D).

The finished TPU can be processed to technical products by conventional methods for processing TPU (injection molding, extrusion, casting). Practical tests have shown that the TPU according to the invention, on account of its specific property profile, is particularly suitable for the production of seals, spider couplings, valves and profiles. It has been found to be particularly suitable for the production of seals and particularly preferably of seals for hydraulic and pneumatic applications.

Components produced from the TPUs according to the invention have a significantly increased hydrolytic stability and resistance to media as well as improved mechanical properties in the high- and low-temperature range, improved tightness as well as significantly improved wear and extrusion behavior and thus a significantly longer service life.

Against this background, the present invention further provides seals, in particular for hydraulic and pneumatic applications, comprising the TPU according to the invention.

The invention will be explained in greater detail by means of the following examples.

Example 1

| Production of a TPU according to the invention | |
|---|---|
| Raw materials used | |
| Desmophen C 2201 | Polycarbonate polyol having a molecular weight of 2000 g/mol |
| Terathane 2000 | Polyether polyol having a molecular weight of 2000 g/mol |
| Capa 2200 | Polyester polyol having a molecular weight of 2000 g/mol |
| TODI | 3,3'-Dimethyl-4,4'-biphenyl diisocyanate |
| 1,4-Butanediol | |

In a reaction vessel, the polyols are melted at 135° C. and premixed, with stirring. After the polyols have been mixed, the total amount of isocyanate is added. After a reaction time of 15 minutes, the 1,4-butanediol is added and the entire mixture is stirred intensively for 30 seconds. The finished TPU is cast in sheets on a hot plate heated to 130° C. and cured there for 10 minutes. The finished TPU sheets are then tempered in a hot-air oven for 12 hours at 110° C. and subsequently granulated. The granules are processed further in an injection molding machine to form seals.

Figure 1:
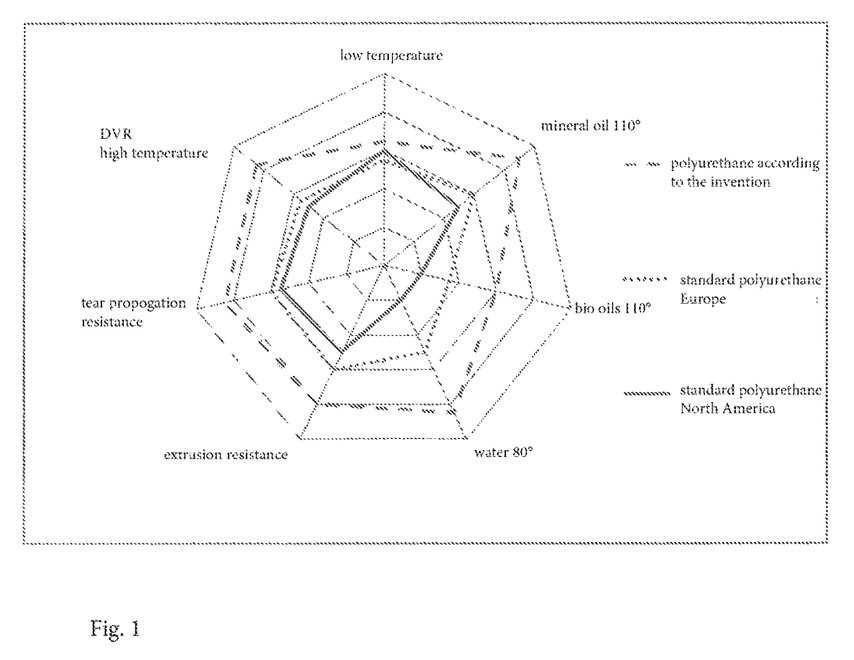
FIG. 1 a comparison of selected properties of the polyurethane according to the invention with two conventional polyurethanes in which the soft segment is based on only one polyol, namely polycaprolactone.

Compared with a standard polyurethane produced using only a polycaprolactone polyol, the material according to the invention has significantly improved mechanical and chemical properties. FIG. 1 shows a comparison of selected properties of the polyurethane according to the invention with two conventional polyurethanes in which the soft segment is based on only one polyol, namely polycaprolactone.

As is shown in FIG. 1, the polyurethane according to the invention exhibits significantly better resistance than the two standard materials to hot water, to hot mineral oils and to hot bio-oils. The polyurethane according to the invention is also significantly superior to the standard materials in terms of extrusion resistance and tear propagation resistance. In the case of the low-temperature properties and the compression set, the gain in performance is not quite as great, but here too the polyurethane according to the invention exhibits better properties than the two comparison materials. In addition to this general comparison, the service life in particular of the polyurethane according to the invention is also to be studied.

Figure 2:
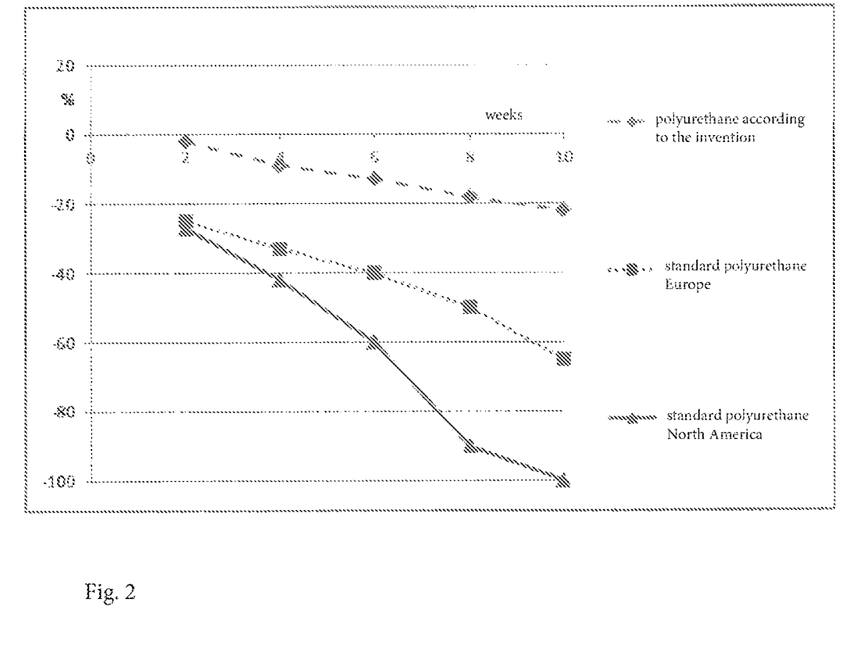
FIG. 2 the change in tensile strength upon storage in warm water at 80° C.
Figure 3:
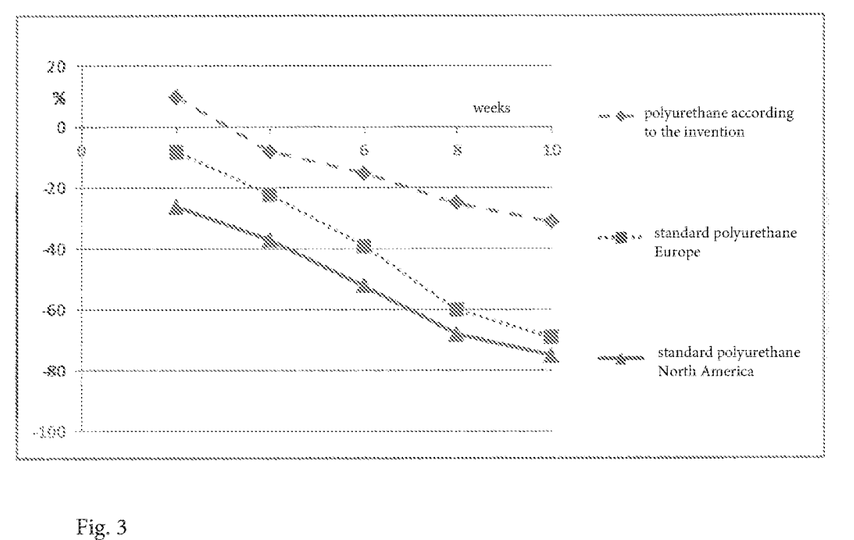
FIG. 3 the change in tensile strength upon storage in hot Shell Tellus 46 hydraulic oil at 110° C.

To that end, FIGS. 2 and 3 show the change in tensile strength upon storage in warm water at 80° C. and in hot Shell Tellus 46 hydraulic oil at 110° C.

As is apparent from FIG. 2 and FIG. 3, the change in tensile strength in both storage media is significantly smaller in the case of the material according to the invention than in the case of the two standard polyurethanes used as comparison.

The possible service life of products such as seals made of the polyurethane according to the invention is thus significantly longer than that of the standard materials used as comparison when used in an aqueous environment and in hydraulic applications.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A thermoplastic polyurethane obtained by a process comprising reacting reagents comprising
   (a) an isocyanate
   (b) a polyol component comprising a combination of a polyester diol (b1), a polyether diol (b2), and a polycarbonate diol (b3), wherein (b1) is present in a proportion not more than 40 mol % of the polyol component, (b2) is present in a proportion of 20-40 mol % of the polyol component, and (b3) is present in a proportion of 40-60 mol % of the polyol component, each of (b1)-(b3) having a molecular weight of from 500 to 5000 g/mol, and
   (c) a diol having a molecular weight of from 62 g/mol to 500 g/mol, wherein at least two of (b1)-(b3) in the combination are present in the form of a copolymer having a molecular weight of from 1000 to 5000 g/mol.

2. The polyurethane of claim 1, wherein the reagents further comprise a trifunctional cross-linker (d) having a molecular weight of from 64 g/mol to 500 g/mol.

3. The polyurethane of claim 1, wherein the molecular weight of the polyol component (b) is in the range of from 1000 g/mol to 3000 g/mol.

4. The polyurethane of claim 1, wherein at least two of (b1)-(b3) in the combination are present in the form of a copolymer having a molecular weight of from 1500 g/mol to 2500 g/mol.

5. The polyurethane of claim 1, wherein the polyester diol (b1) comprises a diol having a molecular weight in a range of from 1500 to 2500 g/mol.

6. The polyurethane of claim 1, wherein the polyester diol (b1) comprises polycaprolactone.

7. The polyurethane of claim 1, wherein the polyether diol (b2) comprises a diol having a molecular weight in a range of from 1500 g/mol to 2500 g/mol.

8. The polyurethane of claim 1, wherein the polyether diol (b2) comprises, in reacted form, ethylene oxide, propylene oxide, and/or a hydroxyl-group-containing polymerization product of tetrahydrofuran.

9. The polyurethane of claim 1, wherein the polycarbonate diol (b3) comprises a diol having a molecular weight in a range of from 1500 g/mol to 2500 g/mol.

10. The polyurethane of claim 1, wherein the polycarbonate diol (b3) comprises, in reacted form, 1,6-hexanediol, 1,9-nonanediol, and/or 1,5-pentanediol.

11. A process for producing the polyurethane of claim 1, comprising:
(A) preparing a mixture comprising a polyester diol (b1), a polyether diol (b2) and a polycarbonate diol (b3), each having a molecular weight of from 500 to 5000 g/mol;
(B) adding an organic diisocyanate (a) to the mixture from (A) in an amount such that an equivalence ratio of NCO groups to NCO-reactive groups is from 2.5:1 to 10:1, to obtain a reaction mixture;
(C) reacting the reaction mixture prepared in (B) at a temperature of >80° C. to form an NCO-terminated prepolymer;
(D) reacting the NCO-terminated prepolymer prepared in (C) with one or more chain extenders (c) having a molecular weight in a range of from 62 g/mol to 500 g/mol, to form a thermoplastic polyurethane, wherein component (c) is used in an amount such that, taking into consideration all the components, an equivalence ratio of NCO groups to NCO-reactive groups of from 0.9:1.0 to 1.2:1.0 is established,
wherein at least two of (b1)-(b3) in the combination are present in the form of a copolymer having a molecular weight of from 1000 to 5000 g/mol.

12. A process of producing a molded body, the process comprising:
contacting the polyurethane of claim 1 with a mold.

13. The process of claim 12, wherein the molded body includes a seal.

14. The process of claim 13, wherein the seal is adapted for hydraulic and pneumatic applications.

15. The polyurethane of claim 1, wherein at least two of (b1)-(b3) in the combination are present in the form of a copolymer having a molecular weight in the range of from 1000 g/mol to 3000 g/mol.

16. The polyurethane of claim 1, wherein the polyester diol (b1) comprises only diols having a molecular weight of from 1500 to 2500 g/mol.

17. The polyurethane of claim 1, wherein the polyether diol (b2) comprises only diols having a molecular weight of from 1500 g/mol to 2500 g/mol.

18. The polyurethane of claim 1, wherein the polyether diol (b2) comprises, in reacted form, ethylene oxide.

19. The polyurethane of claim 1, wherein the polycarbonate diol (b3) comprise only diols having a molecular weight in a range of from 1500 g/mol to 2500 g/mol.

* * * * *